Figure 1:
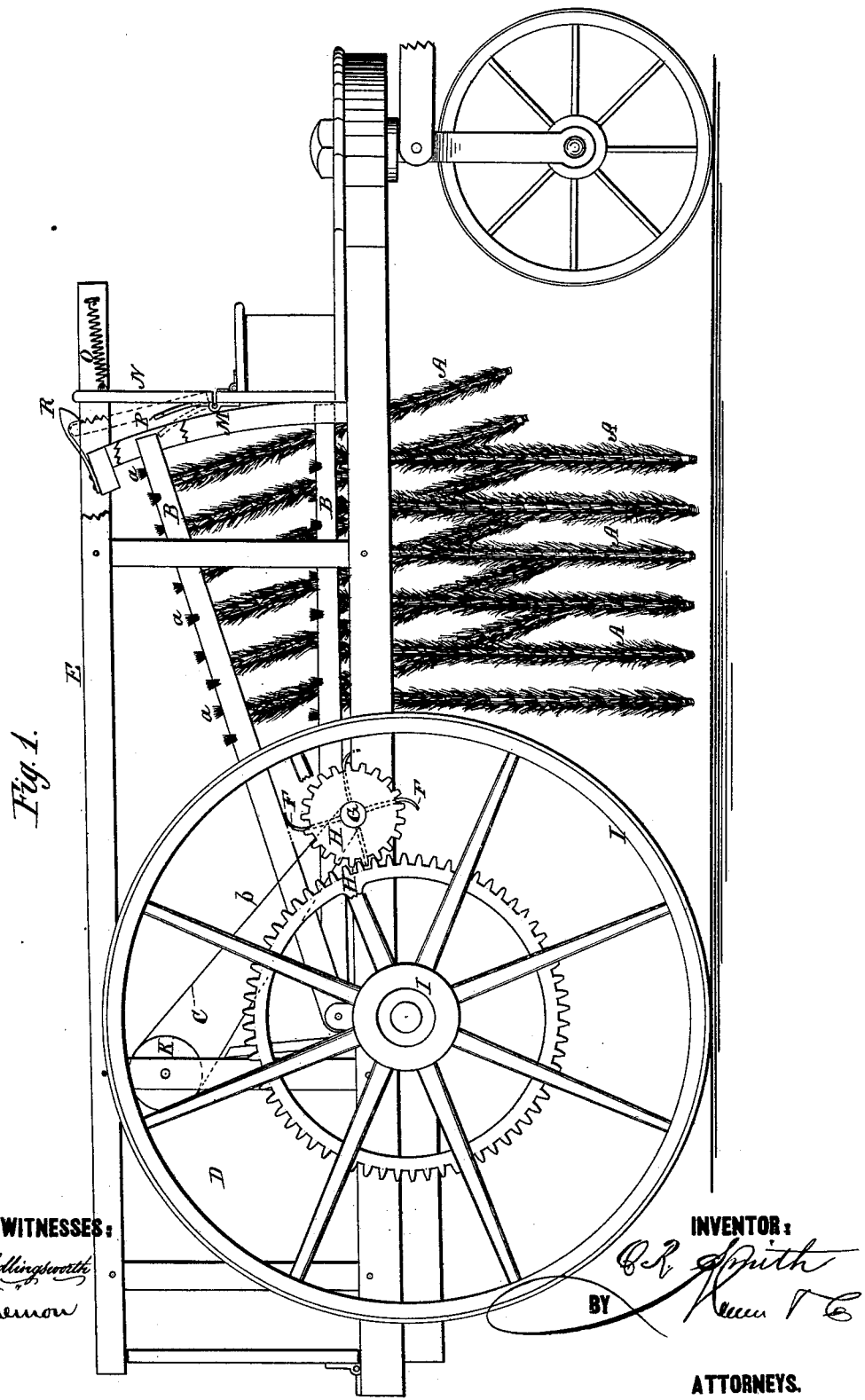

2 Sheets—Sheet 1.

O. R. SMITH.
COTTON-PICKER.

No. 189,396.  Patented April 10, 1877.

WITNESSES:
W. W. Hollingworth
J. C. Kernon

INVENTOR:
O. R. Smith
BY
ATTORNEYS.

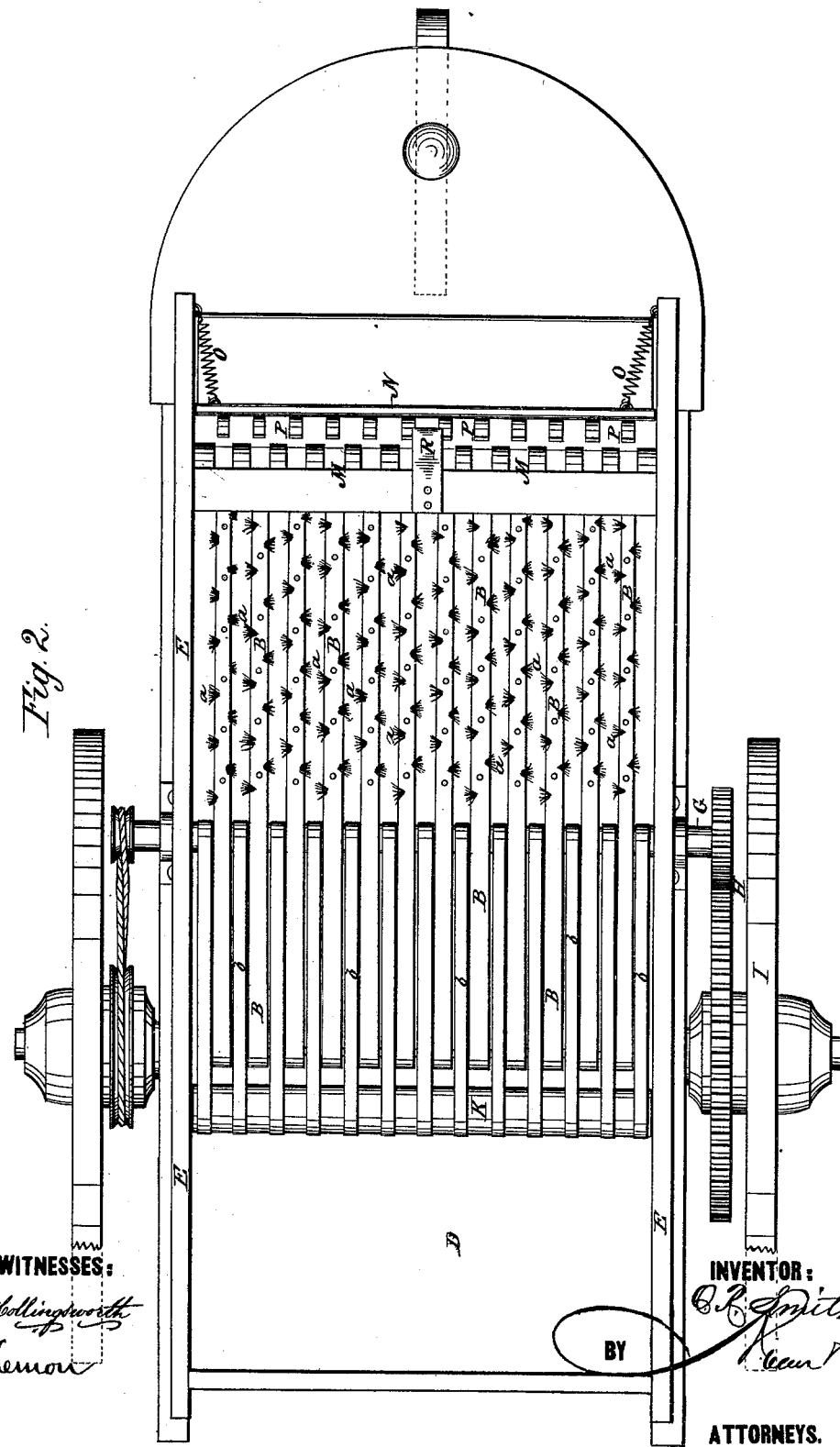

UNITED STATES PATENT OFFICE.

ORREN R. SMITH, OF RALEIGH, NORTH CAROLINA.

IMPROVEMENT IN COTTON-PICKERS.

Specification forming part of Letters Patent No. 189,396, dated April 10, 1877; application filed May 29, 1876.

*To all whom it may concern:*

Be it known that I, ORREN R. SMITH, of Raleigh, in the county of Wake and State of North Carolina, have invented a new and Improved Cotton-Picker; and I do hereby declare that the following is a full, clear, and exact description of the same.

In the accompanying drawing, forming part of this specification, Figure 1 is a side elevation of the machine, with the side of the box or casing removed, and showing one set of picker-bars raised, the other down. Fig. 2 is a top-plan view.

The invention relates to an improvement in that class of cotton-pickers in which two or more series of vertically-operating toothed rods are employed to extract the cotton from the bolls.

The invention consists in the construction and arrangement of parts as hereinafter described and claimed.

A A are the toothed flexible rods; B, the vibrating bars to which they are attached, and C the carrier by which the cotton is conveyed to the receptacle D. The latter is formed in the rear end of the wheeled box E, and the pickers work through the open bottom of the same, as shown.

The body of each of the pickers proper is formed of a rubber tube or rod, or of rattan, or any other material having a suitable degree of flexibility; and these rods are provided with spines or teeth projecting upward, and also outward at a slight angle.

The teeth of cotton-cards are suitable for this purpose; and they may be conveniently applied to the rods by cutting up the card-leather into strips and winding them spirally around the rods. The latter depend from the bars B, which are pivoted at their rear ends, and lie in a nearly horizontal plane within the box E, except when raised by the cams or tappets F, which are attached to the shaft G. The tappets are so arranged that but half the number of bars B are raised at one time, the two sets or series alternating with each other.

The shaft G is constantly rotated, as the machine is drawn along, by means of a gear-connection, H, with one of the transporting-wheels I.

When the machine is drawn through a cotton-field for the purpose of picking the ripe cotton, the wheels are made to run in spaces between the rows of plants, and thus the picker-rods come in contact with the cotton held in the open bolls and extract the same. As the picker which has extracted it again descends, carrying the adhering cotton with it, the two contiguous pickers are ascending, and one of these removes the cotton from the first picker. As the second picker descends, the first again ascends and removes the cotton from the second, and so on till it has been carried up between them and between the bars B. The cotton is assisted in passing up between the bars, and prevented from falling back between them, by means of brushes $a$, which project laterally from the bars. The cotton thus collected above the bars B passes by gravity back into contact with the carrier C, and is by it taken up and delivered into receptacle D. The carrier is formed of a series of belts, $b$, which pass around the tappet-shaft and a roller, K, the latter being located near the top of the box E, immediately above a brush, which is attached to the edge of receptacle D, and serves to remove such portion of the cotton as adheres to the belts.

The rods work up and down between the stems and branches of the plants, and, being flexible, will not be broken or injured by contact with the plants, or any other obstruction to be ordinarily found in a cotton-field, nor effect any injury to the plants themselves.

To hold up the pickers so that the tappets cannot act upon the bars B, I employ the means hereinafter described.

The front ends of the said bars work between the inclined parallel bars of a rack, M, fixed transversely of the box E. Directly in front of this rack is a board, N, which is hinged at the bottom, and is held away from the rack M by means of springs O. Spring-catches P, similar to those ordinarily employed to support window-sash, are attached to the back side of the board N, at points opposite the spaces between the rack-bars. The free ends of the springs project upward and outward from the board N; and hence, when the latter is pressed back against the rack, the springs will catch under the ends of the bars B, as they are raised by the tappets, and hold them up out of action so long as the board is maintained in that position. As a convenient means of holding it, I employ a spring-catch, R. I prefer to have the board form the back of the driver's seat, so that he may readily throw the pickers out of action by simply pressing backward against the board.

What I claim is—

1. In a cotton-picker, the flexible toothed rods A and vibrating bars B, having laterally-projecting brushes, combined and operating substantially as described.

2. In a cotton-picker, the combination of the vertical flexible toothed rods A, horizontal vibrating bars B, tappet-shaft, gearing, and transporting-wheel, as shown and described.

3. In a cotton-picker, the combination of the carrier and vibrating bars carrying toothed rods, and receptacle E, as shown and described.

4. In a cotton-picker, the combination, with the vibrating picker-bars, of the pivoted board, carrying spring-catches, substantially as shown and described.

O. R. SMITH.

Witnesses:
SOLON C. KEMON,
CHAS. A. PETTIT.